(12) United States Patent
Khan

(10) Patent No.: US 8,429,254 B2
(45) Date of Patent: Apr. 23, 2013

(54) METHOD FOR NETWORKABLE DEVICE COMMUNICATION

(75) Inventor: Mohammad Barkat-E-Bary Khan, Owen Sound (CA)

(73) Assignee: GE Security, Inc., Bradenton, FL (US)

( * ) Notice: Subject to any disclaimer, the term of this patent is extended or adjusted under 35 U.S.C. 154(b) by 332 days.

(21) Appl. No.: 12/624,541

(22) Filed: Nov. 24, 2009

(65) Prior Publication Data

US 2011/0125882 A1  May 26, 2011

(51) Int. Cl.
*G06F 15/177* (2006.01)
*G06F 15/16* (2006.01)
*H04J 9/00* (2006.01)
*H04J 3/24* (2006.01)
*H04W 4/00* (2009.01)
*H04L 12/28* (2006.01)

(52) U.S. Cl.
USPC ........... 709/221; 370/255; 370/338; 370/389; 370/475; 709/245

(58) Field of Classification Search .................... 709/221
See application file for complete search history.

(56) References Cited

U.S. PATENT DOCUMENTS

| | | | | |
|---|---|---|---|---|
| 7,257,104 B2 * | 8/2007 | Shitama | ........................ | 370/338 |
| 7,376,745 B2 * | 5/2008 | Shitano et al. | ................ | 709/229 |
| 7,668,114 B2 * | 2/2010 | Kitawaki | ...................... | 370/254 |
| 7,684,392 B2 * | 3/2010 | Saito et al. | .................... | 370/389 |
| 7,974,311 B2 * | 7/2011 | Vesterinen et al. | ........... | 370/475 |
| 2002/0126642 A1 * | 9/2002 | Shitama | ........................ | 370/338 |
| 2004/0225750 A1 * | 11/2004 | Lim et al. | ....................... | 709/245 |
| 2007/0008099 A1 * | 1/2007 | Kimmel et al. | ................ | 340/506 |
| 2008/0263353 A1 * | 10/2008 | Droms et al. | .................. | 709/245 |
| 2009/0121860 A1 * | 5/2009 | Kimmel et al. | ............... | 340/506 |
| 2009/0323557 A1 * | 12/2009 | Tremaine et al. | ............. | 370/255 |

OTHER PUBLICATIONS eIPv6 Addressing for the Annex Architecture Defence Science & Technology, 2004.*

* cited by examiner

*Primary Examiner* — Wing F Chan
*Assistant Examiner* — David X Yi
(74) *Attorney, Agent, or Firm* — Global Patent Operation

(57) ABSTRACT

A networkable device-to-networkable device communication method in Internet Protocol version 6 (IPv6). Embodiments include auto-configuration of IPv6 address and automatic commencement of communication among Fire Panels and other types of wired or wireless networkable devices. Each networkable device obtains its IPv6 address in a number of ways including from the first or any particular networkable device in a network. A designated networkable device instills IPv6 address to its neighboring networkable device, and subsequently the neighboring networkable device instills IPv6 address to its neighboring networkable device dynamically. Embedded Gateways are created dynamically in the network. Each networkable device uses its and its neighboring networkable devices' Embedded Gateways in order to transmit and receive IPv6 multicast, anycast or unicast packets. Embodiments obviate the need to use conventional Ethernet network backbone, networking and routing devices like switch or router, or manual configuration.

9 Claims, 5 Drawing Sheets

METHOD FOR NETWORKABLE DEVICE COMMUNICATION

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to networked systems generally, and more particularly to certain new and useful advances in methods for networkable device communication of which the following is a specification, reference being had to the drawings accompanying and forming a part of the same.

2. Description of Related Art

Life safety products such as Fire Panels ("FPs") are part of a regulated industry. FP communication requires timely delivery of packets in the network with utmost reliability. A FP network is different than a computer network. Computer network communication is based on Internet Protocols, whether IPv6 or IPv4, and often requires routing devices, such as routers. It is almost always the case that the computers in the network are not directly connected to each other. Instead, each computer is connected to the others via networking devices such as switches and/or routers.

BRIEF SUMMARY OF THE INVENTION

Embodiments of the invention make it possible for wired or wireless networkable devices, such as, but not limited to, fire panels ("FPs), to communicate with each other using IPv6 in a network without any additional standalone networking devices, or without any network backbone.

In one embodiment of the invention, a networkable device is configured to use a number of rich features of IPv6 for device-to-device communication in the network. In one embodiment, this translates to a FP configured to use a number of rich features of IPv6 for FP-to-FP communication in a fire control, or life safety, network. IPv6 has large address space, stateless and stateful address configuration, and support for prioritized delivery. Thus, in one embodiment, a networkable device, such as a FP, is configured to use Stateful Address Configuration in the presence of a Dynamic Host Configuration Protocol version 6 (DHCPv6) server and to use Stateless Address Auto-configuration in the absence of a DHCPv6 server.

For ease of description, a fire panel embodiment is primarily described herein, but it is contemplated that other embodiments of the invention comprise and/or may be adapted to support other types of networkable devices, such as those described elsewhere herein.

Accordingly, in order to illustrate the tire panel embodiment of the present invention, the following abbreviations are used frequently herein—including in the drawings:

IPv6—Internet Protocol version 6
FP—Fire Panel
EG—Embedded Gateway of the FP
NFP—Neighboring Fire Panel
128-NFP—128-bit Neighboring Fire Panel (NF having full 128-bit IPv6 address rather than link-local (fe80::/64) IPv6 address)
MLD—Multicast Listener Discovery
MLDv2—Multicast Listener Discovery version 2
ND—Neighbor Discovery
ICMPv6—Internet Control Message Protocol version 6
DHCPv6—Dynamic Host Configuration Protocol version 6
DAD—Duplicate Address Detection
OSPFv3—Open Shortest Path First version 3
FP-to-FP—Fire Panel to Fire Panel
RIPng—Router Information Protocol Next Generation
Router-FP—a FP that act as a router in the network Ethernet-based technology is extensively used in IPv6-based networks. Incorporation of Ethernet-based technology into a Fire Panel enhances its capability to communicate very efficiently, because each Ethernet address is composed of 48 bits, the first 24 bits being a company identifier (CID) and the last 24 bits being a vendor-supplied identifier (VID). In one embodiment, one or more FPs are configured to use the Stateless Address Auto-configuration to calculate an interface identifier based on the networkable device's Ethernet address in order to create a unique interface address. The interface identifier provides the lower 64 bits of IPv6 for a networkable device. Thus, in one embodiment, all networkable devices are configured to use the interface identifier to transmit and receive packets via Embedded Gateways.

An embodiment of a FP-to-FP communication method is provided for use within Internet Protocol version 6 (IPv6). Embodiments of the invention include auto-configuration of IPv6 address and automatic commencement of communication among FPs. Each FP obtains its IPv6 address in a number of ways including from the first or any particular FP in the FP network. A designated FP instills IPv6 address to its neighboring FP, and subsequently the neighboring FP instills IPv6 address to its neighboring FP dynamically. Embedded Gateways are created dynamically in the FP network. Each FP uses its and its neighboring FP's Embedded Gateways in order to transmit and receive IPv6 multicast, anycast or unicast packets. Embodiments of the invention thus obviate the need to use a conventional Ethernet network backbone, networking and routing devices, like switches or routers, or manual configuration.

An exemplary FP network layout, including all FP nodes in the network, and the connections among these nodes, is first depicted in the Figures that accompany and form a part of this document. Additionally, a FP configured to have the full 128-bit, the upper (first) 64-bit and the lower (last) 64-bit, and the embedded gateway ("EG") is presented in the context of the exemplary FP network layout. In one embodiment, every FP is configured to capture its full 128-bit IPv6 address without manual intervention. The EGs are created dynamically based on the availability of the upper 64-bit, or the lower 64-bit, or both of the upper 64-bit and lower 64-bit. All FP nodes are directly connected to each other without any network backbone. Unlike previously known link-local IPv6-based Fire Panels, embodiments of a full 128-bit IPv6-based FP described herein become globally visible after successfully passing duplicate address detection ("DAD").

IPv6 addresses are identifiers used for sets of FP interfaces and for individual FP interfaces. A Unicast FP IPv6 address identities a single FP interface. An anycast FP IPv6 address identifies a predetermined set of FP interfaces; and an anycast packet that is sent to an anycast address is delivered to a particular FP of the predetermined set. An anycast packet is thus routed to the nearest FP that has the anycast address. A Multicast FP IPv6 address identifies a predetermined group of FP interfaces. A multicast packet that is sent to a multicast FP address is delivered to all of the FP interfaces in the group.

Internet Control Message Protocol for IPv6 (ICMPv6), is used for neighboring node interaction on the same link. The ICMPv6 provides packet framework for Neighbor Discovery (ND), and Multicast Listener Discovery (MLD) and MLD version 2 (MLDv2). All FPs can become routers without any manual intervention or configuration, and use ICMPv6, RIPng and OSPFv3 to exchange router solicitation, router advertisement, neighbor solicitation, neighbor advertisement, and redirect information. Router-FP keeps this information in order to create EGs dynamically for robust FP-to-FP communication.

In one aspect of the present invention, each FP creates the lower 64-bit address based on Ethernet address using Stateless Address Auto-configuration without using a DHCPv6 server. Thus, a FP does not require any configuration information when creating the lower 64-bit address. One particular FP can be responsible not only to instill a unique upper 64-bit address, ffff, to itself but also to a number of FPs, or to all of the FPs in the network. Similarly, another FP can be responsible to instill another unique upper 64-bit address, eeee, to a number of FPs, or to the rest of FPs that do not have the upper 64-bit address. At least one FP embeds the upper 64-bit address in itself in a network. It is also possible for each FP to instill its full 128-bit address by itself. This process of instilling IPv6 can be implemented upon booting or starting of a Fire Panel without any configuration information or any manual intervention. In such embodiments, networking devices, such as switches and/or routers, are not required.

In another aspect of the invention, each FP can communicate with other FPs in the network without any network backbone—e.g., the FPs are connected directly to each other. Each FP can communicate with other FP in the network with a link-local IPv6 address (fe80::/64), a full 128-bit IPv6 address (ffff::aaaa; ffff:eeee:dddd:cccc:1111:2222:3333: 4444), or both of the link-local and full 128-bit IPv6 addresses. However, embodiments of the FP described herein do not require any networking or routing equipment in order to create IPv6 address, Embedded Gateway or to communicate with other FPs in a FP network.

In another aspect of the invention, each FP, having its neighboring FPs embedded with the upper 64-bit address, is capable of acquiring the upper 64-bit address from its neighboring FP. A neighboring FP, whose neighboring FPs originally did not have its upper 64-bit address embedded but has acquired its upper 64-bit address from its neighbor, is now capable of acquiring the upper 64-bit address from its neighboring FP, which acquires its upper 64-bit address from its neighboring Fire Panel. Acquiring the upper 64-bit address is thus accomplished without any manual intervention or manual configuration.

In another aspect of the invention, each FP creates an EG with its own IPv6 address and keeps this gateway in its EG table or routing table. Each FP creates the lower 64-bit embedded gateway or the link-local gateway, and keeps this gateway in its EG table. Each FP creates 128-bit EG with its own upper 64-bit address and lower 64-bit address and keeps this gateway in its EG table as well. The presence of link-local EG and 128-bit EG are constantly transmitted and received by FPs in the network. Each FP may use the EGs of its neighboring Fire Panels, or the EGs of its directly connected Fire Panels, and may keep these EGs in its own EG table or routing table. Each FP is capable of embedding gateways used by its neighboring FP. Each Fire Panel is capable of using one or more embedded gateways to transmit and receive packet depending on the type of packet, origination of the packet and/or the destination of the packet. FP may use these EGs for FP-to-FP communication in the network without requiring any network backbone, switch or router.

In another aspect of the present invention, each Fire Panel is configured to create an IPv6 address and an embedded gateway using a DHCPv6 server in a FP network. Each FP is configured to create all or part of the 128-bit IPv6 address in combination with existing DHCPv6 server in the FP network. One or more FPs can be configured to act as the DHCPv6 server. However, embodiments of the invention are configured to operate with or without a DHCPv6 server in the FP network.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features. Embodiments of the invention may be implemented in a computer operating system, software, firmware, hardware or any combination of thereof. Embodiments of the invention may be implemented for FP-to-FP communication in a Fire Panel network without using any conventional network backbone, or any conventional networking devices like switches or routers.

Exemplary Fire Panel Network

Figure 1:
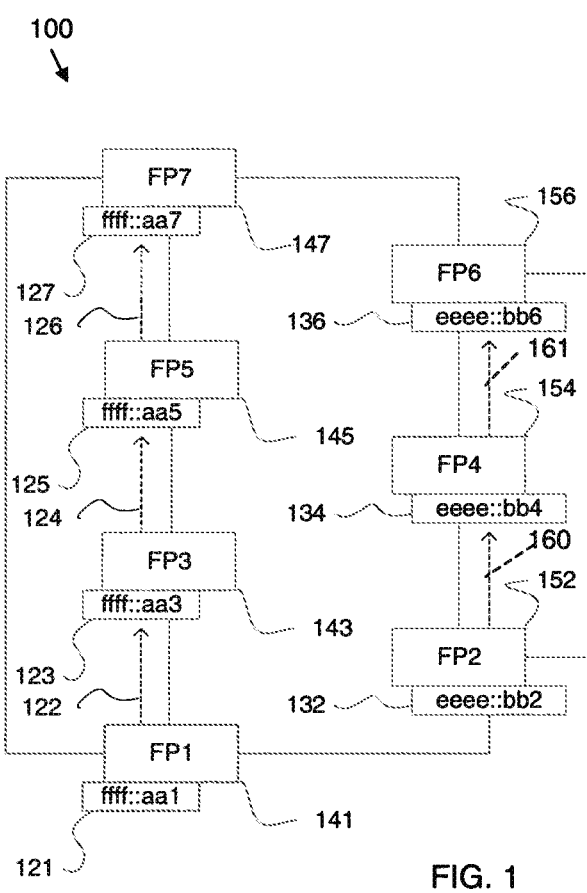
FIG. 1 is a block diagram that illustrates dynamically instilling IPv6 into a group of FPs from one or more designated FPs.

FIG. 1 is a block diagram that illustrates dynamically instilling IPv6 into a group of FPs 143, 145, 147 from a designated FP 141 and into a group of FPs 154 and 156 from a designated FP 152. Together, the FPs 141, 143, 145, 147, 152, 154 and 156 comprise an exemplary FP network 100.

In FIG. 1, an exemplary IPv6 address creation process by a FP 141, 152 in an exemplary FP network 100 is depicted in accordance with the present invention. Each FP, FP1 (141), FP3 (143), FP5 (145), FP7 (147), FP2 (152), FP4 (154) and FP6 (156), is configured to 48-bit Ethernet address or DHCPv6 server in order to create its lower 64-bit address. Each FP, FP1 (141), FP3 (143), FP5 (145), FP7 (147), FP2 (152), FP4 (154) and FP6 (156), is configured to use link-local address (fe80::/64) and/or complete 128-bit IPv6 address (ffff::abcd) to communicate with the other FPs in the FP network 100.

In accordance with an embodiment of the present invention, a number of FPs, FP1 (141), FP3 (143), FP5 (145), FP7 (147), FP2 (152), FP4 (154) and FP6 (156), are connected directly without any networking devices like switches or routers, and without any network backbone. In FIG. 1, Fire Panel FP1 (141) and FP2 (152) create the lower 64-bit addresses aa1 and bb2 respectively via Stateless Address Auto-configuration based on the Ethernet address. The upper 64-bit addresses, ffff and eeee are embedded in FP1 (141) and FP2 (152), respectively. Fire Panel FP1 (141) and FP2 (152) thus have the full 128-bit IPv6 addresses ffff::aa1 and eeee::bb2, respectively. Needless to mention, the upper 64-bit address of the first group of FPs is the same, e.g., ffff, in FP1 (141), FP3 (143), FP5 (145) and FP7 (147). The upper 64-bit address of the second group of FPs is also the same, e.g., eeee, in FP2 (152), FP4 (154) and FP6 (156).

In FIG. 1, Fire Panels, FP3 (143), FP5 (145), FP7 (147), FP4 (154) and FP6 (156) do not have the upper 64-bit address in them at the beginning. Instead, these FPs create the lower 64-bit addresses aa3, aa5, aa7, bb4 and bb6, respectively, based on their respective Ethernet addresses. Each FP, FP1 (143), FP2 (152), FP3 (143), FP5 (145), FP7 (147), FP4 (154) and FP6 (156) is capable of auto-detecting the existence or non-existence of the upper 64-bit of a neighboring FP. For example, FP1 (141) auto-detects that its neighboring FP3 (143) does not have the upper 64-bit address. FP1 (141) then instills 122 the upper 64-bit address, ffff, to Fire Panel FP3 (143); then FP3 (143) instills 124 the upper 64-bit address, ffff, to FP5; and then FP5 (145) instills 126 the upper 64-bit address, ffff, to FP7 (147) without any manual intervention or configuration. Similarly, after auto-detecting that the neighboring FP4 (154) does not have the upper 64-bit address, Fire Panel FP2 (152) instills 160 the upper 64-bit address, eeee, to FP4; and then FP4 (154) instills 161 the upper 64-bit address, eeee, to FP6 (156).

Thus, before the instilling process, Fire Panels, FP1 (141), FP3 (143), FP5 (145), FP7 (147), FP2 (152), FP4 (154) and FP6 (156), have addresses of ffff::aa1 (121), fe80::aa3 (not shown), fe80::aa5 (not shown), fe80::aa7 (not shown), eeee::bb2 (132), fe80::bb4 (not shown), and fe80::bb6 (not shown), respectively. After instilling process, the Fire Panels FP1 (141), FP3 (143), FP5 (145), FP7 (147), FP2 (152), FP4 (154) and FP6 (156) have addresses of ffff::aa1 (121), ffff::aa3 (123), ffff::aa5 (125), ffff::aa7 (127), eeee::bb2 (132), eeee::bb4 (134), and eeee::bb6 (136), respectively. Fire Panels FP2 (152), FP4 (154) and FP6 (156) have the same upper 64-bit eeee.

Figure 2:
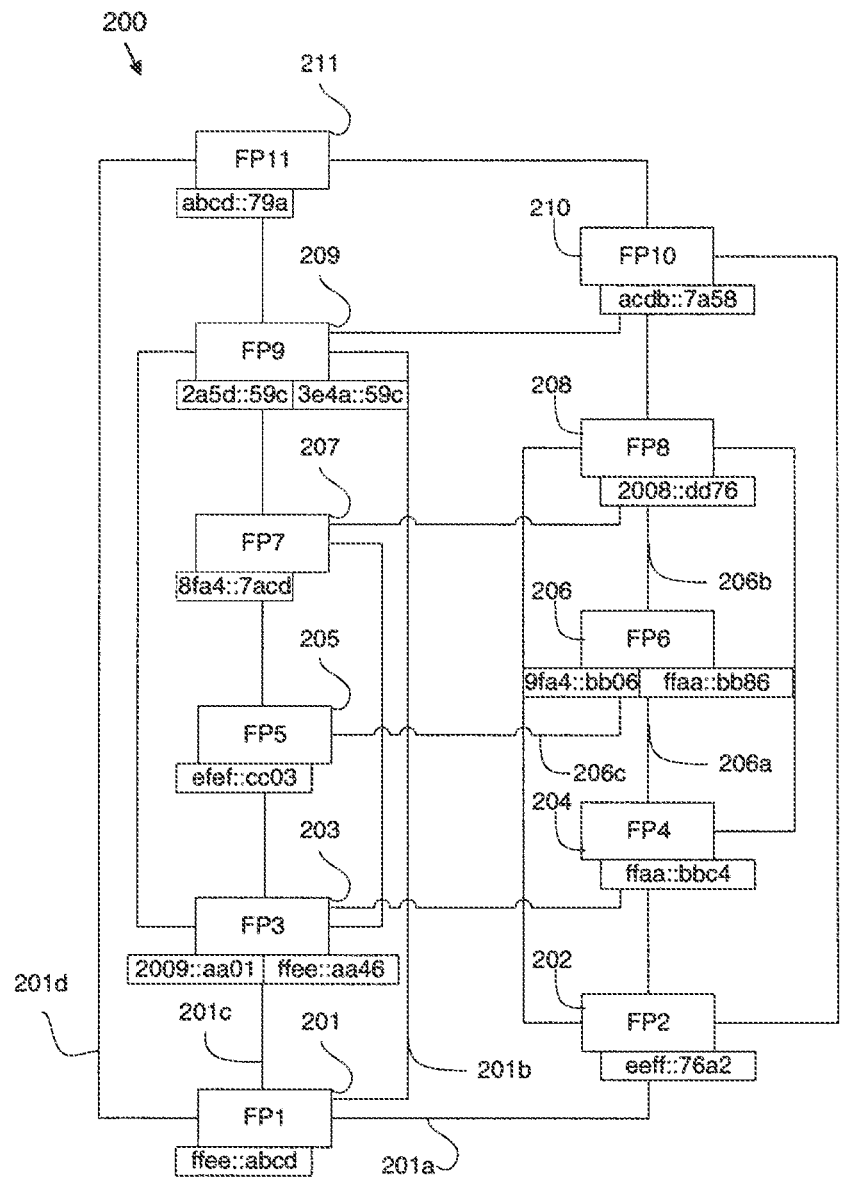
FIG. 2 is a diagram showing FPs connected in a FP network, with each FP having a unique upper 64-bit address.

FIG. 2 is a diagram showing FPs, FP1 (201), FP2 (202), FP3 (203), FP4 (204), FP5 (205), FP6 (206), FP7 (207), FP8 (208), FP9 (209), FP10 (210) and FP11 (211) directly connected to each other in a FP network 200, without a network backbone. In contrast to each FP in FIG. 1, the FPs in FIG. 2 each have a unique upper 64-bit address.

One or more FP's in the FP network 200 may be embedded with a unique upper 64-bit address. For example, FP1 (201) and FP3 (203) have the same upper 64-bit address, ffff; and FP4 (204) and FP6 (206) have the same upper 64-bit address, ffaa. FP3 (203) and FP6 (206) have another unique set of upper 64-bit addresses, 2009 and 9fa4, respectively.

Fire Panel FP3 (203), FP6 (206) and FP9 (209) have two full 128-bit IPv6 addresses. Fire Panels FP1 (201), FP2 (202), FP3 (203), FP4 (204), FP5 (205), FP6 (206), FP7 (207), FP8 (208), FP9 (209), FP10 (210) and FP 11 (211) have the full 128-bit IPv6 addresses: ffee::abcd, eeff::76a2, 2009::aa01 and ffee::aa46, ffaa::bbc4, efef:cc03, 9fa4::bb06 and ffaa::bb86, 8fa4::7acd, 2008::dd76, 2a5d::59c, 3e4a::59c, acdb::7a58, and abcd::79a, respectively. Fire Panel FP1 (201) is connected with FP2 (202), FP9 (209), FP3 (203), and FP11 (211) via direct connections 201*a*, 201*b*, 201*c* and 201*d*, respectively. Fire Panel FP6 (206) is connected with FP4 (204), FP8 (208), and FP5 (205) via direct connections 206*a*, 206*b*, and 206*c*, respectively.

According to the embodiments of the present invention, FP1 (201) is capable of instilling its upper 64-bit address, ffee, to its neighboring FP3 (203) despite the fact that FP3 (203) has another set of its own upper 64-bit 2009. As a result, FP3 (203) has two full 128-bit IPv6 addresses, 2009::aa01 and ffee::aa46; one of its upper 64-bit addresses, ffee, is acquired from its neighboring FP1 (201). FP4 (204) is capable of instilling its upper 64-bit address, ffaa, to its neighboring FP6 (206) despite the fact that FP6 (206) has its own upper 64-bit address, 9fa4. FP4 (204) instills its upper 64-bit address, ffaa, to its neighboring Fire Panel FP6 (206). As a result, FP6 (206) has two full 128-bit IPv6 addresses—9fa4::bb06 and ffaa::bb86; one of its upper 64-bit addresses, ffaa, is acquired from its neighbor FP4 (204).

Figure 5:
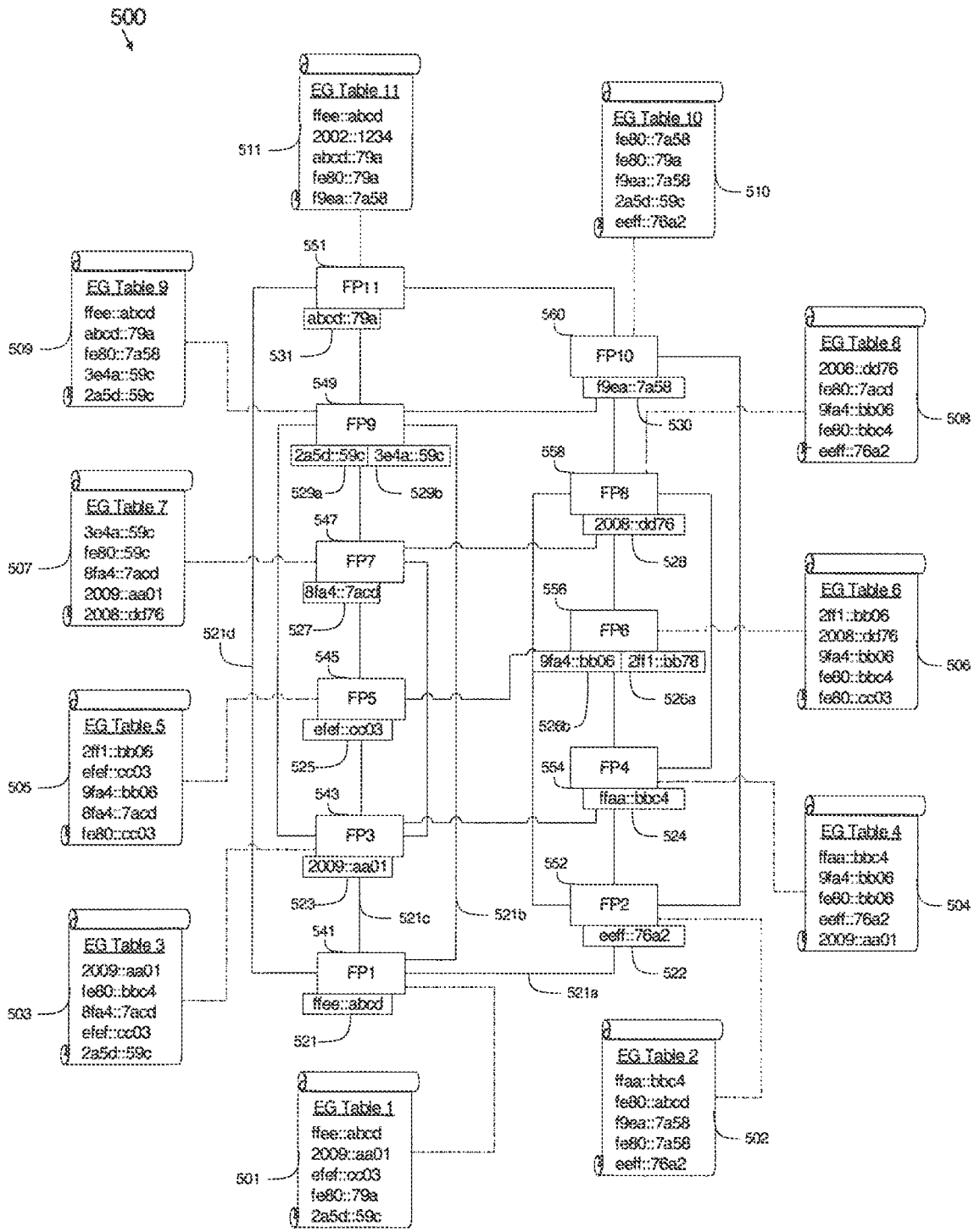
FIG. 5 is block diagram illustrating a FP having an Embedded Gateway in accordance with the present invention.

Needless to mention, each FP in the FP system 200 can have multiple IPv6 addresses, For example, FP3 (203), FP6 (206) and FP9 (209) are shown in FIG. 2 with two IPv6 addresses. As another example, FP6 (526*a*, 526*b*) and FP9 (529*a*, 529*b*) are shown in FIG. 5 with two IPv6 addresses. However, in one embodiment, each FP in FIG. 2 is configured to obtain multiple upper 64-bit address from: (a) itself, (b) its neighbor, (c) its neighbor's neighbor, (d) any FP—which may be directly or indirectly connected, (e) from a DHCPv6 server, or (f) any combination thereof. For example, if the upper 64-bit address does not exist in a FP then a default upper 64-bit address, e.g., fe80::/64 is used instead. Additionally, another default upper 64-bit address, fe80::abcd/64, is treated as link-local IPv6 address rather than a full 128-bit EPv6 address. Thus, in an embodiment where the FP Network 200 has no DHCPv6 server, the lower 64-bit address in each Fire Panel FP1 (201), FP2 (202), FP3 (203), FP4 (204), FP5 (205), FP6 (206), FP7 (207), FP8 (208), FP9 (209), FP10 (210) and FP11 (211) is created by each FP itself via Stateless Address Auto-configuration.

Method of Auto-configuration

Figure 3:
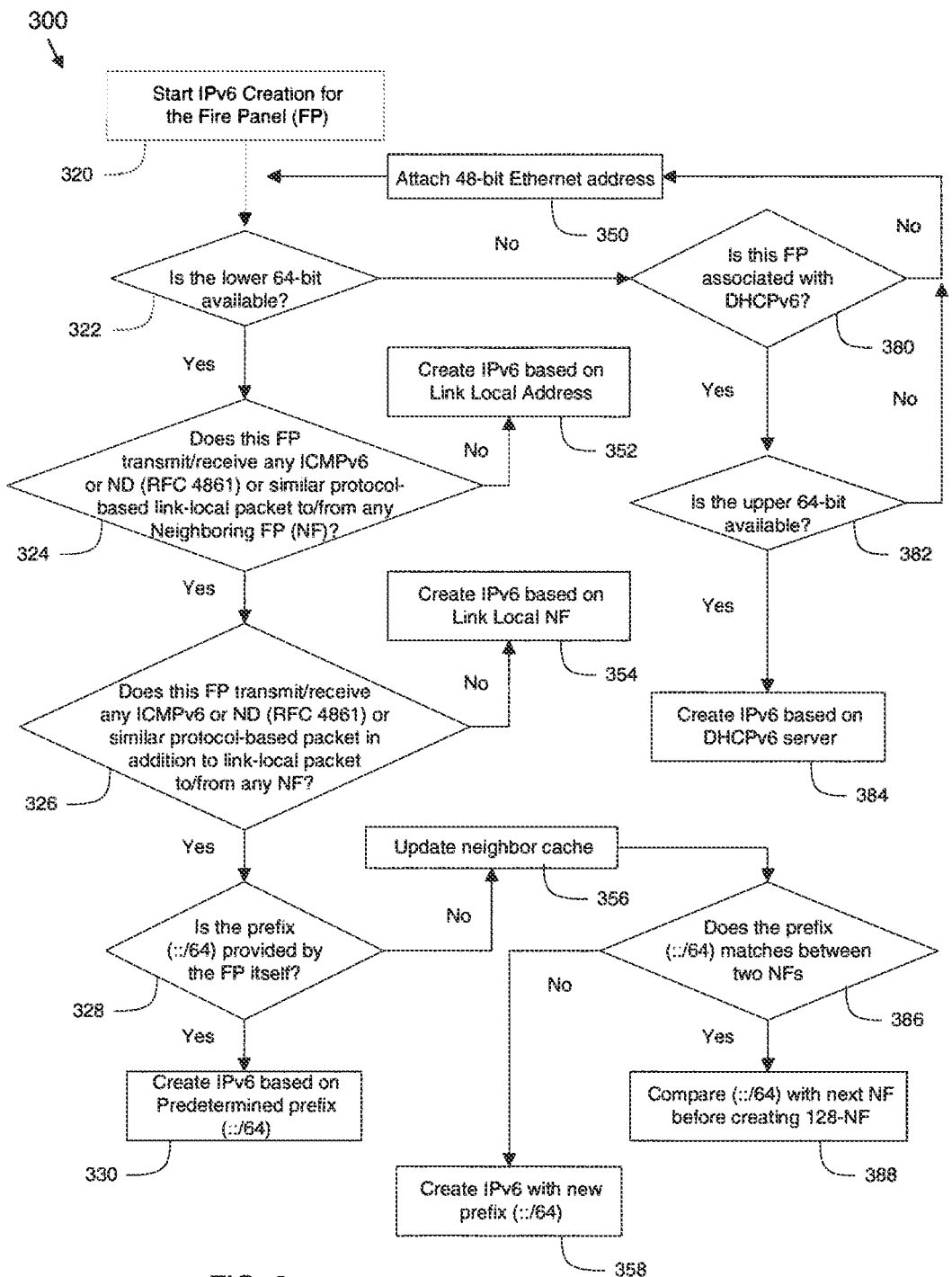
FIG. 3 is a flowchart illustrating an exemplary method in which a FP creates 128-bit IPv6 address dynamically without any manual intervention.

FIG. 3 is a flowchart illustrating an exemplary method 300 in which a FP creates a 128-bit IPv6 address dynamically without any manual intervention. One or more of the features of the method 300 are preferably embodied in computer hardware, software and/or firmware and configured to be performed by one or more FPs, such as those illustratively depicted in FIGS. 1 and 2.

Referring now to FIGS. 1, 2, and 3, as mentioned previously, each FP in a FP Network 100 or 200 is capable of creating its own IPv6 address regardless of the availability of DHCPv6 server in the network 100 or 200.

The method 300 comprises starting 320 IPv6 creation for a FP in a FP network 100 or 200. This step may further comprise each FP auto-detecting its neighboring FP/FPs and beginning transmitting and receiving ICMPv6 or ND packets using IPv6.

The method 300 further comprises verifying 322 the availability of the lower 64-bit address. If no, the method 300 further comprises determining 380 whether this FP is (or is associated with) a DHCPv6 server. If yes, the method 300 further comprises determining 382 whether an upper 64-bit address is available. If yes, the method 300 further comprises creating 384 an IPv6 address based on data supplied by the DHCPv6 server. If the answer to either determination 380 or determination 382 is no, the method 300 further comprises attaching 350 a 48-bit Ethernet address. Thereafter, the method 300 may proceed as noted below.

If yes, the method 300 further comprises determining 324 whether the FP transmitted and/or received any ICMPv6, ND (RFC 4861) or similar protocol based packet to/from any neighboring FP in the network 100, 200. If no, the method 300 further comprises creating 352 a link-local IPv6 address for the FP.

If yes, the method further comprises determining 326 whether the FP transmitted and/or received any ICMPv6 or ND (RFC 4861) or similar protocol based packet in addition to a link-local packet to and/or from any NFP. If no, the method 300 further comprises creating a link-local IPv6 address for the NFP.

If yes, the method further comprises determining 328 whether the prefix (::/64) is provided by the FP itself. If yes, the method 300 further comprises creating 330 an IPv6 address based on the predetermined prefix (::/64).

If no, the method 300 further comprises updating 356 a cache of the NFP. Thereafter, the method 300 further comprises determining 386 whether the prefix (::/64) matches between two NFPs. If no, the method 300 further comprises creating 358 an IPv6 address with the new prefix (::/64). If yes, the method 300 further comprises comparing 388 the prefix (::/64) with the next NFP before creating a 128-bit IPv6 address for the NFP.

Thus, in the absence of the lower 64-bit in a FP, the DHCPv6 server is not only responsible for verifying 382 the availability of the upper 64-bit addresses and assigning the upper 64-bit address to a FP but also for assigning 384 the full 128-bit address, which includes the lower 64-bit address, to a FP. If a FP is not able to verify its lower 64-bit address instantly and is also not associated with a DHCPv6 server for obtaining its lower 64-bit address, then the Fire Panel attaches 350 a 48-bit Ethernet address in order to capture the lower 64-bit address.

Thus, referring again to the flowchart of FIG. 3, a FP, having predetermined prefix (::/64) of upper 64-bit embedded in itself (328), is capable of creating its full 128-bit (330) including the upper and lower 64-bit. In accordance with the invention, in FIG. 1, FP1 (141) creates its full 128-bit IPv6 address, (fffT::aa1), first and then compares its upper 64-bit address, ffff, with its neighboring Fire Panel FP3's (143) upper 64-bit address. FIG. 3 illustrates that each FP's neighbor cache is being constantly updated (356). A FP does not instill the upper 64-bit address to its neighboring FP/FPs before comparing prefix (::/64) between two 128 bit addressed NFPs (386). If the lower 64-bit address does not exist or lower 64-bit address is not created in a FP then the full 128-bit IPv6 address creation process is handled by a DHCPv6 server (380, 382, 384). If the prefix (::/64) does not match (386) then the FP creates its 128-bit IPv6 address with new prefix (::/64) (358), which is depicted in FIG. 2. FP1, ffee::abcd, (201) instills ffee into FP3, ffee::aa46 (203). Fire Panels constantly transmit/receive ICMPv6 and/or ND packets to/from it's NFPs, and compare the prefix (::/64) in the network before creating a 128-bit address for the NFP (388).

Embedded Gateway Methods

Figure 4:
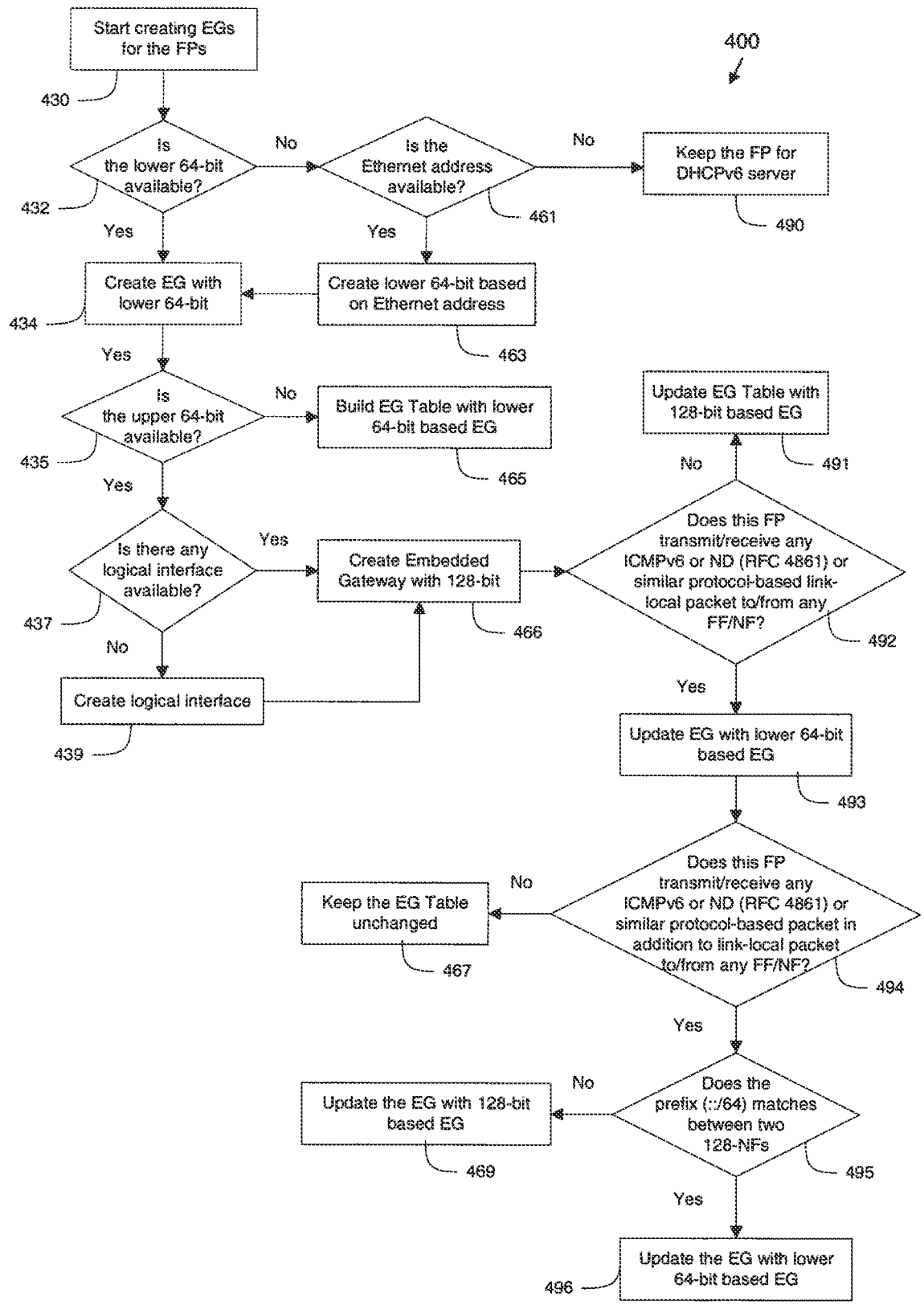
FIG. 4 is a flowchart illustrating an exemplary method in which a FP creates Embedded Gateway dynamically without any manual intervention.

FIG. 4 is a flowchart illustrating an exemplary method 400 in which a FP creates Embedded Gateway dynamically without any manual intervention. FIG. 5 is a block diagram illustrating a FP network 500 having one or more FPs, FP1 (541), FP2 (552), FP3 (543), FP4 (554), FP5 (545), FP6 (556), FP7 (547), FP8 (558), FP9 (549), FP10 (560) and FP11 (551), each having an Embedded Gateway Table 501, 503, 504, 504, 505, 506, 507, 508, 509, 510 and 511, respectively.

FIG. 4 and FIG. 5 illustrate the process of how Fire Panels FP1 (541), FP2 (552), FP3 (543), FP4 (554), FP5 (545), FP6 (556), FP7 (547), FP8 (558), FP9 (549), FP10 (560) and FP 11 (551) create and keep the Embedded Gateways ("EGs") 501, 503, 504, 504, 505, 506, 507, 508, 509, 510 and 511 consistent with the present invention. Each FP FP1 (541), FP2 (552), FP3 (543), FP4 (554), FP5 (545), FP6 (556), FP7 (547), FP8 (558), FP9 (549), FP10 (560) and FP11 (551) uses routing capabilities that include router discovery, prefix discovery, routing parameter discovery, next-hop determination, and neighbor unreachability detection. Each FP FP1 (541), FP2 (552), FP3 (543), FP4 (554), FP5 (545), FP6 (556), FP7 (547), FP8 (558), FP9 (549), FP10 (560) and FP11 (551) also uses router solicitation, router advertisements, neighbor solicitation, neighbor advertisements and redirect for FP-to-FP communication in the network. At least one FP acts as a router in the network. Each FP receives router advertisement from the Router-FP (FP1, 521; FP4, 524); and each FP is capable of embedding one or more Router-FP as EG for efficient routing.

The embodiment of the method 400 of FIG. 4 illustrates that each FP uses EG Tables 501, 503, 504, 504, 505, 506, 507, 508, 509, 510 and 511 for sending and receiving IPv6 packets in a FP network 500.

The method 400 begins by creating 430 EGs for each of the fire panels FP1 (541), FP2 (552), FP3 (543), FP4 (554), FPS (545), FP6 (556), FP7 (547), FP8 (558), FP9 (549), FP 10 (560) and FP11 (551). The method 400 further comprises determining 432 whether a lower 64-bit address is available. If no, the method 400 further comprises determining 461 whether an Ethernet address is available. If the Ethernet address is not available, the method 400 further comprises designating 490 the FP as the DHCPv6 server. If the Ethernet address is available, the method 400 further comprises creating 463 a lower 64-bit address based on the Ethernet address. Thereafter, proceeding from either the determination 432 or from the creation 463, the method 400 further comprises creating an EG having the available or created lower 64-bit address.

The method 400 further comprises determining 435 whether an upper 64-bit address is available. If no, the method 400 further comprises building an EG table containing lower 64-bit based EGs.

If yes, the method 400 further comprises determining 437 whether any logical interface is available. If no, the method 400 further comprises creating 439 a logical interface. Thereafter, proceeding either from the determination 437 or the creation 439, the method 400 further comprises creating 466 an EG having a 128-bit address.

The method 400 further comprises determining 492 whether the FP transmitted and/or received any ICMPv6 or ND (RFC 4861) or similar protocol based link-local packet to and/or from any FF/NFP. If no, the method 400 further comprises updating 491 the EG table with the 128-bit based EG.

If yes, the method 400 further comprises updating 493 the EG with the lower 64-bit based EG from the EG table. Thereafter, the method 400 further comprises determining 494 whether the FP transmitted and/or received any ICMPv6 or ND (RFC 4861) or similar protocol based packet in addition to a link-local packet to and/or from any FF/NFP. If no, the method 400 further comprises keeping 467 the EG table unchanged.

If yes, the method 400 further comprises determining 495 whether the prefix (::/64) matches between two 128-bit based NFPs. If no, the method 400 further comprises updating 469 the EG with the 128-bit address. If yes, the method 400 further comprises updating 496 the EG with the lower 64-bit address.

Thus, referring again to FIG. 4, in the presence of a DHCPv6 server (490), a Fire Panel follows steps 430, 432 and 461; the DHCPv6 server is capable of creating 128-bit EG. A FP creates the lower 64-bit address (463) upon detecting the Ethernet address before creating the lower 64-bit EG or the link-local gateway (434). After creating EGs, each Fire Panel keeps this EG (465) in an EG table.

FIGS. 4 and 5 also illustrate the presence of a link-local EG being constantly transmitted via ICMPv6 and/or ND packet (492) in the FP network 500. Both of the lower 64-bit based EG and the full 128-bit based EG are constantly being updated in the same EG table; this update can take place at the same time or simultaneously (491, 493). Each FP, having a 128-bit based EG, casts its presence in the FP network 500 (494). The EG table remains unchanged (467) in the event of no new 64-bit EG or 128-bit EG's presence being transmitted or received. Each FP is capable of using both link-local EG and 128-bit EG to transmit a multicast packet. The process of updating the EG table resumes (469, 496) depending upon whether the prefix (::/64) matches between two 128-NFs (495) while the presence of a new Fire Panel is detected in the network.

For example, in FIG. 5, FP1 (541) obtains IPv6 address ffee::abcd (521), creates gateway ffee::abcd and keeps this gateway in its EG table "EG Table 1" (501). Similarly in FIG. 5, Fire Panels, FP2 (552), FP3 (543), FP4 (554), FP5 (545), FP6 (556), FP7 (547), FP8 (558), FP9 (549), FP10 (560) and FP11 (551), create gateways by their respective IPv6 addresses, eeff::76a2 (522), 2009::aa01 (523), ffaa::bbc4 (524), efef:cc03 (525), 9fa4::bb06 and 2ff1::bb78 (526b, 526a), 8fa4::7acd (527), 2008::dd76 (528), 2a5d::59c and 3e4a::59c (529a, 529b), f9ea::7a58 (530) and abcd::79a (531). These gateways are kept in "EG Table 2" (522), "EG Table 3" (523), "EG Table 4" (524), "EG Table 5" (525), "EG Table 6" (526), "EG Table 7" (527), "EG Table 8" (528), "EG Table 9" (529), "EG Table 10" (530), and "EG Table 11" (531) respectively. Each FP has its own IPv6 address and EG table. FIG. 5 illustrates Fire Panels, its IPv6 addresses and EG tables—(FP1, 521, 501), (FP2, 522, 502), (FP4, 524, 504), (FP6, 526a, 526b, 506), (FP8, 528, 508), (FP10, 530, 510), (FP11, 531, 511), (FP9, 529a, 529b, 509), (FP7, 527, 507), (FP5, 525, 505), and (FP3, 523, 503) respectively. Each Fire Panel, FP1 (541), FP2 (552), FP3 (543), FP4 (554), FP5 (545), FP6 (556), FP7 (547), FP8 (558), FP9 (549), FP 10 (560) and FP 11 (551) is capable of holding or storing any number of IPv6 addresses and gateways but only one EG table.

FP uses EG for FP-to-FP communication in the FP network 500. In accordance with the present invention, a FP creates 128-bit Embedded Gateway (466) after identifying the upper 64-bit (435), the lower 64-bit (432) and the logical interface (437, 439); all tables show full 128-bit IPv6-based EGs in FIG. 5. For example, "EG Table 1" (501), "EG Table 2" (502) and "EG Table 3" (503) tables show full 128-bit IPv6 address-based EGs ffee::abcd, eeff::76a2 and 2009::aa01 respectively. Each FP creates gateways based on the lower 64-bit and keeps in its EG table; FP11 (531) creates gateway fe80::79a based on its lower 64-bit (79a) and keeps this gateway in its own EG table "EG Table 11" (511). Each FP is capable of creating gateways based on full 128-bit IPv6, which is shown in every table in FIG. 5. FP1 (521) creates EG based on its own IPv6 address ffee::abcd and keeps this gateway in its EG table "EG Table 1" (501).

According to an embodiment of the present invention, each FP creates EG/EGs (434) after identifying the lower 64-bit (432); the "EG Table 5" (505) shows link-local EG fe80::cc03 is created by FP5's (FIG. 5) lower 64-bit ::cc03 (525). According to the embodiments of the present invention, "EG Table 1" (501) illustrates all five embedded gateways created by FP1 (521) for FP-to-FP communication in the network. Each FP is capable of creating any number of EGs depending on available FPs in the network. FP1 (521) is connected with FP2 (522), FP9 (529a, 529b), FP3 (523), and FP11 (531) via direct connections (521a), (521b), (521c) and (521d) respectively. Each FP, i.e. FP1 (521), is capable of embedding gateways, ffee::abcd, created by its own IPv6, ffee::abcd.

According to the present invention, FP1 (521) not only may use gateway 2009::aa01 (523) since this gateway is created by its neighboring Fire Panel FP3's (523) IPv6 address but also may use all the gateways, fe80::bbc4, 8fa4::7acd, efef::cc03 and 2a5d::59c, exist in "EG Table 3" (503) since this table is owned by its neighboring Fire Panel FP3 (523). Each FP is capable of keeping and updating its EG table or routing table with its neighboring Fire Panel's EGs. FP1 (521) is capable of embedding gateway fe80::79a since this gateway exists in EG table (511) owned by Fire Panel FP 11 (531), which is directly connected (521d) with FP1 (521). Similarly, FP1 (521) keeps gateway 2a5d::59c (529a) in its own EG table or routing table since this IPv6 2a5d::59c (529a) is owned by Fire Panel FP9, which is directly connected with FP1 (521). Each Fire Panel FP1 (541), FP2 (552), FP3 (543), FP4 (554), FP5 (545), FP6 (556), FP7 (547), FP8 (558), FP9 (549), FP 10 (560) and FP 11 (551) transmits and receives IPv6 packets via an EG.

Additionally, each Fire Panel, FP1 (541), FP2 (552), FP3 (543), FP4 (554), FP5 (545), FP6 (556), FP7 (547), FP8 (558), FP9 (549), FP 10 (560) and FP 11 (551), obtains the lower 64-bit using Stateless Address Auto-configuration. One or more FPs can embed the upper 64-bit and subsequently can be responsible to instill the upper 64-bit to its neighboring FPs. A NFP, which originally did not have the upper 64-bit, is now empowered with the upper 64-bit. The newly empowered NFP instills the upper 64-bit to its neighboring FP. Each Fire Panel, FP1 (541), FP2 (552), FP3 (543), FP4 (554), FP5 (545), FP6 (556), FP7 (547), FP8 (558), FP9 (549), FP10 (560) and FP11 (551), creates a EG with its own IPv6 address and keeps this gateway in its EG table or routing table. Each Fire Panel, FP1 (541), FP2 (552), FP3 (543), FP4 (554), FP5 (545), FP6 (556), FP7 (547), FP8 (558), FP9 (549), FP10 (560) and FP11 (551), is capable of embedding gateways used by its neighboring FP and the gateways of directly connected FPs. Each FP uses these embedded gateways for FP-to-FP communication in the FP network 500.

Embodiments of the invention provide one or more technical effects, among which are: the auto-configuration of 48 bit Ethernet addresses, IPv6 lower 64 bit addresses and/or IPv6 64 bit upper addresses—as well as the auto-creation of one or more embedded gateways and/or embedded gateway tables—for one or more Fire Panels in a FP network 100, 200 and/or 500. Another technical effect is that embodiments of the invention allow for automatic network configuration—e.g. no manual configuration is required—even for the first network device.

Together FIGS. 1, 2, 3, 4, and 5 are block diagrams and flowcharts that illustrate various embodiments of computer-implemented methods. Each block, or combination of blocks, depicted in the block-diagrams and/or flowcharts are implemented by computer executable or computer readable instructions ("computer program instructions"). These computer program instructions are loaded onto, or otherwise executable by, a computer or other programmable apparatus to produce a machine, such that the computer program instructions that execute on the computer or other programmable apparatus create means or devices for implementing the functions specified in the flowcharts. These computer program instructions are also stored in a computer-readable memory that can direct a computer or other programmable apparatus to function in a particular manner, such that the instructions stored in the computer-readable memory produce an article of manufacture, including instruction means or devices which implement the functions specified in the flowcharts.

Accordingly, blocks or steps of the block diagrams and/or flowcharts support combinations of means or devices for performing the specified functions, and program instruction means or devices for performing the specified functions. It will also be understood that each block or function of the block diagrams and/or flowcharts, and combinations of blocks or actions depicted therein, can be implemented by (i) a special or general purpose hardware-based computer system that is configured to perform the specified functions or steps, or by (ii) combinations of general and/or special purpose hardware and computer-readable/computer executable instructions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, other embodiments of the invention are not limited to fire panels, but may comprise any type of wired or wireless networkable device that is configured to communicate using IPv6. Non-limiting examples of such networkable devices are personal computers, wireless handheld devices, such as cell phones and personal digital assistants, mass notification devices, smoke detectors, security panels; televisions, and the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method for configuring network configurable devices that are directly connected with each other in a network, the method comprising:
creating, using one of the network configurable devices, a lower 64-bit IPv6 address using Stateless Address Autoconfiguration based on an Ethernet address of the one network configurable device;
creating, using the one network configurable device, an upper 64-bit IPv6 address:
storing the created upper 64-bit IPv6 address in a cache of the one network configurable device;
instilling, the created upper 64-bit IPv6 address into a cache of a neighboring one of the network configurable devices;
creating, using a lower 64-bit IPv6 address of the neighboring network configurable device, a link-local gateway of the neighboring network configurable device;
keeping the link-local gateway in an embedded gateway table of the neighboring network configurable device;
creating, using the lower 64-bit IPv6 address and the instilled upper 64-bit IPv6 address, a 128-bit embedded gateway of the neighboring network configurable device;
keeping the 128-bit embedded gateway of the neighboring network configurable device in the embedded gateway table of the neighboring network configurable device;
transmitting the presence of the link-local embedded gateway and 128-bit embedded gateway of the neighboring network configurable device to the one network configurable device; and
communicating, using an embedded gateway table of the one network configurable device and the embedded gateway table of the neighboring network configurable device, between the network configurable devices.

2. The method of claim 1, wherein the one network configurable device has a number of unique lower 64-bit IPv6 addresses and a number of unique upper 64-bit IPv6 addresses.

3. The method of claim 1, wherein each of the network configurable devices has a number of unique 128-bit IPv6 addresses.

4. The method of claim 1, further comprising:
creating, using the one network configurable device, an embedded gateway without any conventional network backbone or any networking or routing devices.

5. The method of claim 4, wherein creating, using the one network configurable device, an embedded gateway, occurs when the one network configurable device associates itself with an existing network configurable device in the network, or becomes part of the network, without requiring any manual intervention or manual configuration.

6. The method of claim 4, wherein creating, using the one network configurable device, an embedded gateway further comprises:
creating, using the one network configurable device, a link-local embedded gateway that comprises the lower 64-bit IPv6 address of the one network configurable device and the created upper 64-bit IPv6 address, wherein the upper 64-bit IPv6 address is of the type: fe80::/64.

7. The method of claim 6, wherein creating, using the one network configurable device, an embedded gateway further comprises:
creating, using the one network configurable device, a 128-bit embedded gateway, wherein the created 128-bit embedded gateway has a 128-bit address of the type ffff::abcd.

8. The method of claim 7, wherein the embedded gateway table of the one network configurable device stores the created link-local embedded gateway and the created 128-bit embedded gateway for device-to-device communication.

9. The method of claim 7, wherein each of the network configurable devices is a fire panel.

* * * * *

UNITED STATES PATENT AND TRADEMARK OFFICE
CERTIFICATE OF CORRECTION

PATENT NO.         : 8,429,254 B2
APPLICATION NO.    : 12/624541
DATED              : April 23, 2013
INVENTOR(S)        : Khan It is certified that error appears in the above-identified patent and that said Letters Patent is hereby corrected as shown below:

In the Specification

In Column 1, Line 49, delete ""("FPs),"" and insert -- ("FPs"), --, therefor.

In Column 2, Line 3, delete "tire" and insert -- fire --, therefor.

In Column 4, Line 42, delete "is" and insert -- is a --, therefor.

In Column 6, Line 12, delete "efef:cc03," and insert -- efef::cc03, --, therefor.

In Column 6, Line 47, delete "EPv6" and insert -- IPv6 --, therefor.

In Column 7, Line 54, delete "(fffT::aa1)," and insert -- (ffff::aa1), --, therefor.

In Column 8, Line 17, delete "FP FP1" and insert -- FP, FP1 --, therefor.

In Column 8, Line 22, delete "FP FP1" and insert -- FP, FP1 --, therefor.

In Column 8, Line 37, delete "FPS" and insert -- FP5 --, therefor.

In Column 9, Line 42, delete "efef:cc03" and insert -- efef::cc03 --, therefor.

In Column 9, Line 54, delete "(FPS," and insert -- (FP5, --, therefor.

In Column 11, Line 48, delete "panels;" and insert -- panels, --, therefor.

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,429,254 B2

In the Claims

In Column 11, Line 67, in Claim 1, delete "device:" and insert -- device; --, therefor.

In Column 12, line 2, in Claim 1, delete "address:" and insert -- address; --, therefor.